US008395534B2

(12) United States Patent  
Christophe et al.

(10) Patent No.: US 8,395,534 B2  
(45) Date of Patent: Mar. 12, 2013

(54) METHOD AND SYSTEM FOR METEOROLOGICAL MONITORING ABOARD AN AIRCRAFT

(75) Inventors: Laure Christophe, Colomiers (FR); Garance Raynaud, Cornebarrieu (FR)

(73) Assignee: Airbus Operations SAS, Toulouse (FR)

( * ) Notice: Subject to any disclaimer, the term of this patent is extended or adjusted under 35 U.S.C. 154(b) by 931 days.

(21) Appl. No.: 12/575,325

(22) Filed: Oct. 7, 2009

(65) Prior Publication Data

US 2010/0090867 A1 Apr. 15, 2010

(30) Foreign Application Priority Data

Oct. 9, 2008 (FR) ...................................... 08 05574

(51) Int. Cl.  
*G08B 23/00* (2006.01)
(52) U.S. Cl. ................. 340/970; 340/977; 701/4; 701/9
(58) Field of Classification Search .................. 340/970, 340/977; 701/4, 9  
See application file for complete search history.

(56) References Cited

U.S. PATENT DOCUMENTS

| | | | | |
|---|---|---|---|---|
| 3,025,514 A | * | 3/1962 | Alexander et al. | 342/29 |
| 5,077,558 A | * | 12/1991 | Kuntman | 342/26 B |
| 5,202,690 A | * | 4/1993 | Frederick | 342/26 B |
| 5,781,146 A | * | 7/1998 | Frederick | 342/26 B |
| 5,828,332 A | * | 10/1998 | Frederick | 342/26 B |
| 6,002,347 A | | 12/1999 | Daly | |
| 6,381,538 B1 | | 4/2002 | Robinson | |
| 6,549,161 B1 | | 4/2003 | Woodell | |
| 6,597,305 B2 | * | 7/2003 | Szeto et al. | 340/601 |
| 2003/0016156 A1 | * | 1/2003 | Szeto et al. | 342/26 |

FOREIGN PATENT DOCUMENTS

| | | |
|---|---|---|
| WO | 92/10804 | 6/1992 |
| WO | 03/008997 | 1/2003 |

OTHER PUBLICATIONS

Preliminary Search Report dated Jun. 5, 2009.

* cited by examiner

*Primary Examiner* — Eric M Blount  
(74) *Attorney, Agent, or Firm* — Dickinson Wright PLLC

(57) ABSTRACT

A system configured for viewing meteorological data and generating said alerts in an aircraft. The system includes a navigation screen configured to display meteorological data in a monitoring plane at a determined altitude (Zs), and an altitude determination unit configured to determine the current altitude (Zp) of the aircraft. A processor is configured to determine the difference in altitude (Dz) between the aircraft's current altitude (Zp) and the altitude of the monitoring plane (Zs). The determined altitude difference (Dz) is compared with a first predetermined deviation threshold (S1), and a first alert (A1) is emitted under conditions in which the altitude difference (Dz) attains or exceeds the first predetermined deviation threshold (S1) and the altitude difference (Dz) diverges.

10 Claims, 4 Drawing Sheets

US 8,395,534 B2

METHOD AND SYSTEM FOR METEOROLOGICAL MONITORING ABOARD AN AIRCRAFT

FIELD OF THE INVENTION

The invention relates to assistance with the piloting of an aircraft and, more particularly, the monitoring of the meteorological conditions aboard an aircraft, for example a transport airplane.

BACKGROUND OF THE INVENTION

It is known that the pilots of an airplane are assisted by numerous viewing screens mounted in the flight deck and on which the pilots can read data and measurements useful for navigating the airplane. In particular, these viewing screens make it possible to provide data relating to the meteorological conditions, to the flight itinerary and to the terrestrial relief.

Among the set of flight deck viewing screens, at least two screens are used to view meteorological data (turbulence, clouds, bad weather).

The first so-called "navigation" screen (known as the "Navigation Display") makes it possible to provide meteorological data in a horizontal plane, that is to say at constant altitude. The horizontal plane, in which the meteorological data are monitored, is termed the "monitoring plane".

The second viewing screen, the so-called "vertical screen", makes it possible to provide relief data and meteorological data in a vertical plane, that is to say at different altitudes. This vertical screen takes the form of a rectangle whose left lateral edge is graduated vertically in altitude. A symbol representing the airplane is displayed on the vertical screen at the altitude of the latter, the pilot thus being able to easily observe whether bad weather is forming above or below the airplane. The airplane symbol can move vertically on the vertical screen. Indeed, in the climb phase, the airplane is for example situated at the bottom of the screen so as to improve the observation of the meteorological conditions above the airplane. On the other hand, in the descent phase, the airplane can be positioned at the top of the screen, thus improving the visibility of the relief and the observation of the meteorological conditions under the airplane.

In addition to the relief data and the meteorological data, the vertical screen also makes it possible to represent the position of the monitoring plane which is displayed on the navigation screen. Stated otherwise, the vertical screen makes it possible to visually represent the position of the horizontal plane for which the meteorological data are displayed on the navigation screen. For this purpose, a continuous horizontal straight line is displayed on the vertical screen at the altitude of the monitoring plane when a function, commonly termed the "elevation function", is activated.

As a general rule, the altitude of the monitoring plane is modified automatically so as to correspond to the itinerary of the airplane. In order to anticipate possible bad weather, the pilot can modify the altitude of the monitoring plane manually. It is this function which is known by the term "elevation function". The continuous straight line representing the monitoring plane can then be moved vertically on the vertical screen, the meteorological data displayed on the navigation screen then being updated as a function of the altitude selected for the monitoring plane.

This elevation function exhibits a major drawback when the monitoring plane is moved out of the limits of the vertical screen, that is to say to an altitude above that corresponding to the upper edge of the vertical screen or to an altitude below that corresponding to the lower edge of the vertical screen, it no longer being possible for the altitude of the monitoring plane to be represented by the altitude graduations of the vertical screen. The continuous line representing the position of the monitoring plane abuts against the edge of the screen, the edge of the screen and said continuous line then merging into one.

In order to more distinctly represent the position of the monitoring plane when the altitude of the monitoring plane is out of the limits of the vertical screen, the position of the monitoring plane is represented by a discontinuous and thickened straight line in proximity to the edge of the screen. Unfortunately, when the altitude of the monitoring plane is off-limits, there is a risk that the altitude of the monitoring plane will be wrongly interpreted by the pilot. Indeed, the pilot may err and interpret the discontinuous line as a continuous line, the pilot then being persuaded to monitor the meteorological data at the altitude corresponding to the screen's display limit.

Moreover, the pilot may omit to switch the elevation function to automatic mode after having modified the altitude of the monitoring plane. The pilot then thinks he is observing meteorological data at the altitude of the airplane, although the monitoring plane has been moved manually. The airplane may thus pass through zones of bad weather which were not anticipated by the pilot, the airplane then possibly being endangered.

Moreover, it frequently occurs that, on the navigation screen, one of the pilots monitors the meteorological data and the other pilot the terrain data. Now, it may happen that one of the pilots manipulates the elevation function without warning the other pilot, and this may give rise to a poor interpretation of the displayed data.

SUMMARY OF THE INVENTION

The object of the invention is to remedy these drawbacks.

To this end, according to the invention, the method for generating alerts for a system for viewing meteorological data of an aircraft, the system comprising viewing means able to display the meteorological data in a monitoring plane at a determined altitude although the aircraft is situated at its current altitude, is noteworthy in that:
- the altitude difference between said current altitude and said altitude of the monitoring plane is formed;
- said altitude difference is compared with a predetermined deviation threshold; and
- a first alert is emitted if said altitude difference attains or exceeds said deviation threshold and if said altitude difference diverges.

When it is sought to attract the pilot's attention in the event that the elevation function is omitted, it is necessary to avoid emitting alerts when the pilot uses the elevation function intentionally. Indeed, the untimely emission of "false" alerts for the attention of the pilots is a drawback to be avoided. When false alerts are emitted too frequently, the alerts received, be they false or true, are then not fully considered, it then being possible for a genuine alert to go unnoticed.

Such a method according to the invention advantageously makes it possible to forewarn the pilot in the event that the elevation function is omitted. Indeed, if the aircraft is far away from the altitude of the monitoring plane (detection of a deviation) and the aircraft is getting further and further away from it (detection of a divergence), it is very probable that the pilot may not be interested in the meteorological conditions in the monitoring plane. There is therefore a risk of error: an alert must be emitted.

Preferably, a second alert is emitted if said altitude difference attains or exceeds said deviation threshold and if said altitude difference converges. This advantageously makes it possible to forewarn the pilot of a possible omission of the elevation function and to limit the risk of error. The deviation alert is a preliminary alert.

Preferably still, the vertical speed of the aircraft is measured and it is deduced that said altitude difference diverges when said altitude difference is positive and said vertical speed of the aircraft is positive, or when said difference of altitudes is negative and said vertical speed of the aircraft is negative.

The vertical speed of the aircraft, positive when the altitude of the aircraft is increasing and negative when the altitude of the aircraft is decreasing, makes it possible to detect a divergence of the aircraft.

According to a particular characteristic of the invention, the emission of said first alert is disabled when said vertical speed of the aircraft is, in absolute value, below a predetermined speed threshold.

This advantageously makes it possible not to trigger untimely alerts during "porpoising" of the aircraft, that is to say when the value of the altitude of the aircraft oscillates about a constant altitude. Indeed, such a phenomenon prevents the detection, with a large probability, of a divergence of the aircraft. The presence of a speed threshold makes it possible to limit the emission of false alerts.

Preferably, a second alert is emitted if said altitude difference attains or exceeds said deviation threshold and if said vertical speed of the aircraft is, in absolute value, below a predetermined speed threshold.

Advantageously, the vertical speed of the aircraft is measured and a third alert is emitted when said vertical speed is, in absolute value, above said speed threshold, said altitude difference diverges and said altitude difference is below said deviation threshold.

It is possible to emit the first alert when said altitude difference attains or exceeds said deviation threshold for a duration equal to or greater than a predetermined time threshold and said altitude difference converges.

This advantageously makes it possible to preclude the possibility of the aircraft remaining at an altitude too far from the monitoring plane for a long time period.

It is advantageous to display an alert message on the viewing means upon the emission of an alert. The nature of the alert message displayed can correspond to the nature of the alert emitted (deviation, divergence or critical alert). This allows the pilot to rapidly detect a possible omission of the elevation function.

Preferably, a flashing alert message is displayed on the viewing means upon the emission of a first alert.

The flashing of the alert message makes it possible to accentuate the first alert with respect to the other alerts (divergence and deviation).

The invention also relates to a system for viewing meteorological data for an aircraft, comprising at least viewing means displaying the meteorological data in a monitoring plane at a determined altitude and means for acquiring the current altitude of the aircraft, said system being noteworthy in that it comprises:

processing means designed to form the altitude difference between said current altitude and said altitude of the monitoring plane, to compare said altitude difference with a deviation threshold, and to detect a divergence of said altitude difference; and means for generating alerts designed to emit a first alert for the pilot in the event that said altitude difference attains or exceeds the deviation threshold and that the altitude difference diverges.

The figures of the appended drawing will elucidate the manner in which the invention may be embodied. In these figures, identical references designate similar elements.

DETAILED DESCRIPTION OF THE INVENTION

Figure 1:
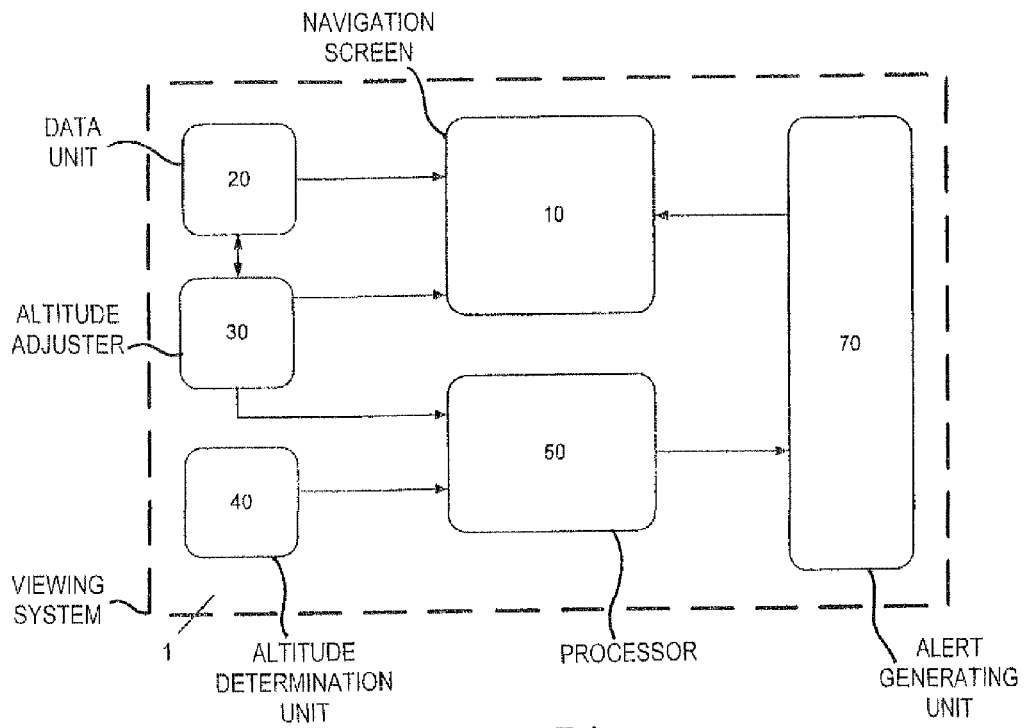
FIG. 1 schematically represents a system for viewing meteorological data for an aircraft according to a first embodiment of the invention.

The system 1 for viewing meteorological data in accordance with the invention, represented schematically in FIG. 1, is intended to assist operators (pilot, copilot, etc) of an aircraft during the piloting of said aircraft, for example a transport airplane (not represented).

Figure 7:
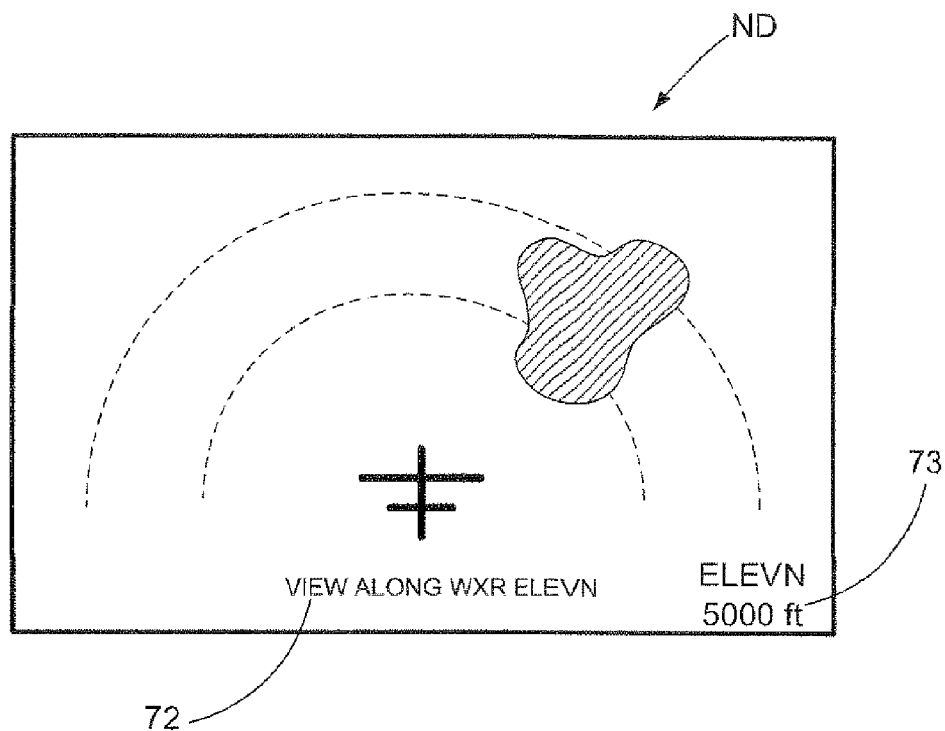
FIG. 7 schematically represents the emission of an alert message on a navigation screen of a viewing system in accordance with the invention.

This system comprises viewing means 10 displaying meteorological data in a monitoring plane at a determined altitude Zs. The viewing means 10 comprise a screen for viewing the meteorological data in a horizontal plane, that is to say at constant altitude (FIG. 7). This screen, termed a "navigation screen ND", is better known as a "Navigation Display". The horizontal plane, in which the meteorological data are monitored, is termed the monitoring plane.

The system 10 for viewing meteorological data is linked to means 20 for acquiring meteorological data, for example a meteorological radar 20, whose function is to acquire, inter alia, the meteorological data downstream of the trajectory of the aircraft in the constant altitude monitoring plane Zs, the data acquired being dispatched to the navigation screen ND with a view to their display.

The navigation screen ND is linked to means 30 for adjusting the altitude of the monitoring plane Zs, for example a rotary button 30, whose function is to modify the altitude Zs at which the meteorological data are acquired by the meteorological radar 20.

With reference to FIG. 1, the means 30 for adjusting the altitude of the monitoring plane Zs are also linked to the navigation screen ND, so as to display on said navigation screen ND the altitude of the monitoring plane Zs selected by the rotary button 30. The manual modification of the altitude of the monitoring plane Zs is a function known to the operators and is usually termed the "elevation function".

The system for viewing meteorological data 1 comprises, furthermore, means 40 for acquiring the current altitude of the aircraft Zp. These means 40 can take the form of an altimeter 40 measuring the current altitude of the aircraft Zp over time.

The meteorological data viewing system 1 comprises, furthermore, processing means 50 which are linked to the means 30 for adjusting the altitude of the monitoring plane Zs and to the means 40 for acquiring the flight altitude Zp of the aircraft. The processing means 50 are designed to compare the current altitude of the aircraft Zp with the altitude of the monitoring plane Zs and to deduce therefrom the altitude difference Dz. The processing means 50 are also designed to detect, on the one hand, a significant deviation in altitude between the current altitude of the aircraft Zp and the altitude of the monitoring plane Zs, and, on the other hand, a divergence of the aircraft with respect to the altitude of its altitude monitoring plane Zs.

The processing means 50 can take the form of a calculation unit whose function is to activate alerts as a function mainly of the values of the current altitude of the aircraft Zp and of the altitude of the monitoring plane Zs. The processing means 50 comprise various discrete logic elements which will be described when presenting the various embodiments of the invention.

The processing means 50 are linked to means 70 for generating alerts, belonging to the meteorological data viewing system 1, which emit alerts as a function of the activation messages dispatched by the processing means 50. With reference to FIG. 1, the means 70 for generating alerts are linked to the viewing means 10 so as to emit visual alerts, for example, on the navigation screen ND. The various alerts will be detailed subsequently.

It goes without saying that the means 70 for generating alerts could also comprise a loudspeaker so as to emit auditory alerts for the attention of the operators.

Figure 2:
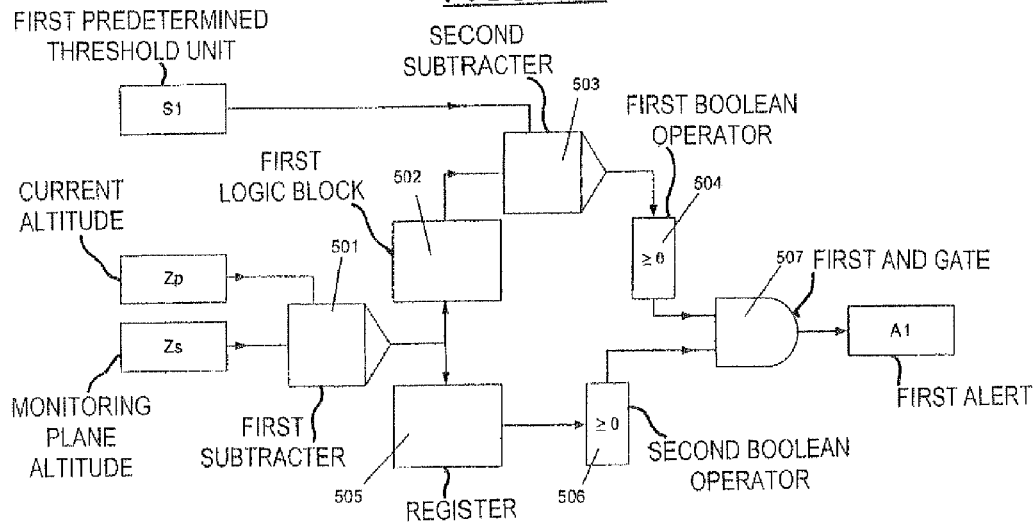
FIG. 2 schematically represents the processing means of the viewing system of FIG. 1.

In a first embodiment of the invention, illustrated by FIG. 2, the processing means 50 of the meteorological data viewing system 1 are designed to detect a deviation when the difference between the current altitude of the aircraft Zp and the altitude of the monitoring plane Zs exceeds or equals a first predetermined deviation threshold S1.

The first threshold S1 can be constant, but it goes without saying that it could also be dynamic, that is to say evolving over time.

The processing means 50 are represented schematically by logic elements which act on the inputs (S1, Zs, Zp) of said processing means 50 so as to emit as output, under certain conditions, a message for activating a first alert A1.

The processing means 50 receive as input the current altitude of the aircraft Zp, the altitude of the monitoring plane Zs and the first deviation threshold S1. In a first comparison step, a first subtracter 501 subtracts the value of the altitude of the monitoring plane Zs from the value of the current altitude of the aircraft Zp so as to deduce therefrom the altitude difference Dz.

In a second comparison step, a second subtracter 503 subtracts the absolute value of the difference of the altitudes, calculated by the logic block 502 linked to the subtracter 501, from the first threshold S1. A Boolean operator 504, mounted at the output of the second subtracter 503, emits as output an affirmative response if its input is positive or zero, a negative response being emitted in the other cases.

Thus, when the deviation between the altitudes of the monitoring plane Zs and of the aircraft Zp exceeds or attains the first deviation threshold S1, the response provided by the Boolean operator 504 is affirmative and a deviation is detected. The discrete logic elements 501, 502, 503, 504, making it possible to detect a deviation, form the deviation detection logic chain.

The processing means 50 of the meteorological data viewing system 1 are also designed to detect a divergence of the aircraft with respect to the altitude of its monitoring plane Zs.

For this purpose, the processing means 50 comprise a register 505 for tracking the evolution of the difference of altitudes Dz whose function is to compare the altitude difference Dz between two successive instants so as to deduce therefrom a divergence index $\Delta Dz$. In this example, the divergence index $\Delta Dz$ is equal to the difference between the absolute value of the altitude difference Dz at an instant T and this same value at an instant T−1 ($\Delta Dz = ABS(Dz(T)) - ABS(Dz(T-1))$). Stated otherwise, the divergence index $\Delta Dz$ makes it possible to measure the increase/decrease of the deviation. With reference to FIG. 2, the input of the register 505 is linked to the output of the subtracter 501 providing the difference of altitudes Dz.

A Boolean operator 506, mounted at the output of the register 505, emits as output an affirmative response if the value of the divergence index $\Delta Dz$, received as input, is positive or zero, a negative response being emitted in the other cases.

Thus, when the difference between the altitudes of the monitoring plane Zs and of the aircraft Zp is increasing, the response provided by the Boolean operator 506 is affirmative. The discrete logic elements 505, 506, making it possible to detect a divergence, form the divergence detection logic chain.

The outputs of the Boolean operators 504 and 506 are linked to the inputs of an AND gate 507 which is designed to emit a message for activating a first alert A1 when its two inputs are simultaneously affirmative, no activation message being emitted in the other cases. When a deviation and a divergence are detected simultaneously, the activation message is transmitted to the means for generating alerts 70 which emit the first alert A1.

Thus, the first alert A1 is emitted to attract the attention of the operators if the altitude difference Dz attains or exceeds the first deviation threshold S1 and if the altitude difference Dz diverges. The first alert A1 is a critical alert.

In a first exemplary implementation, the altitude of the monitoring plane is constant and equal to 60000 feet (18 300 meters), the first deviation threshold S1 is fixed and equal to 4000 feet (1 200 meters) and the altitude of the aircraft evolves in accordance with table 1 below.

TABLE 1

| Implementation example 1 | | | |
|---|---|---|---|
| Instants (in seconds) | T1 = 10 | T2 = 30 | T3 = 50 |
| Current altitude of the aircraft Zp (in feet) | 57000 | 56500 | 56000 |
| Altitude of the monitoring plane Zs (in feet) | 60000 | 60000 | 60000 |
| Dz | −3000 | −3500 | −4000 |
| $\Delta Dz$ | — | 500 | 500 |
| Activation of an alert | NO | NO | A1 |

With reference to table 1, between the instants T1 and T2, the absolute value of the altitude difference Dz is below the first threshold S1 (3000<4000). No deviation is detected. A divergence is detected at the instant T2 since the aircraft is moving away from the altitude of the monitoring plane (ΔDz>0). Given that the deviation and divergence criteria are not complied with simultaneously, no alert is emitted.

At the instant T3, the absolute value of the difference of altitudes Dz is equal to the first threshold S1. A deviation is detected. A divergence is also detected at the instant T3 (ΔDz>0), the aircraft continuing to move further away from the altitude Zs of the monitoring plane. As a divergence and a deviation are detected simultaneously, a first alert A1 is emitted.

Figure 3:
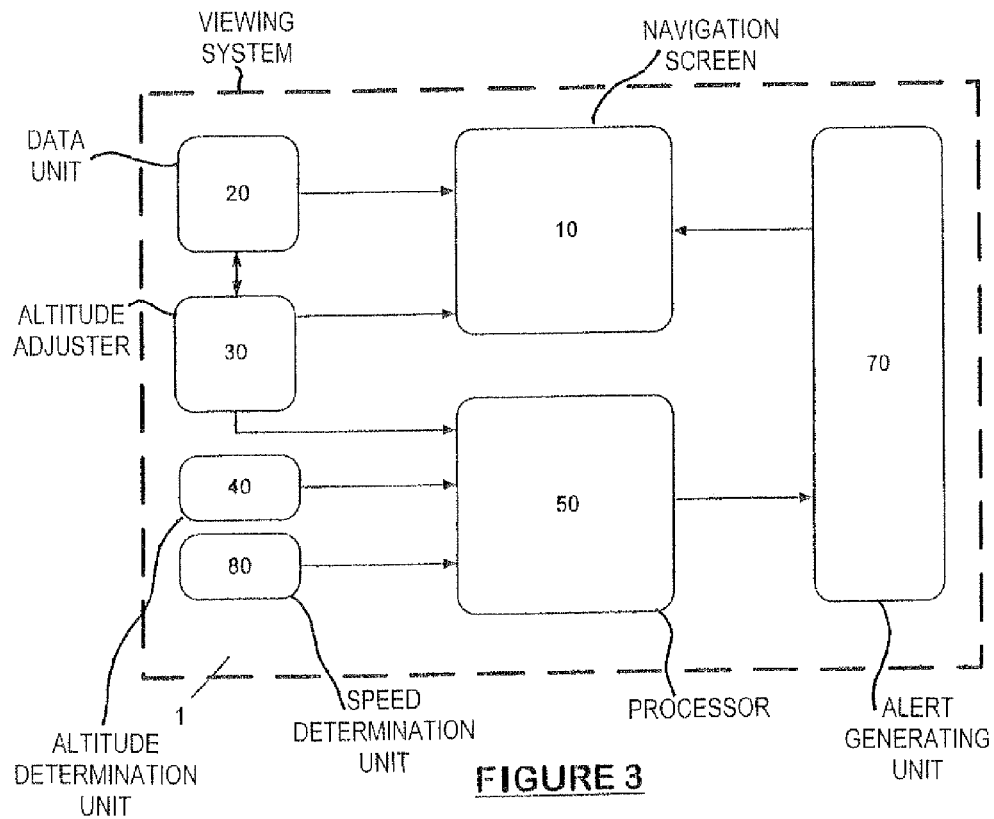
FIG. 3 schematically represents a system for viewing meteorological data for an aircraft according to a second embodiment of the invention.

In a second embodiment of the invention, illustrated by FIG. 3, the references used for the elements which are similar to the elements of the device of FIG. 1 are the same. Otherwise, the whole of the description of the device of FIG. 1 is not repeated, this description applying to the device of FIG. 3, when there are no incompatibilities. The same goes for the following third and fourth embodiments.

In this second embodiment of the invention of FIG. 3, the meteorological data viewing system 1 comprises means 80 for acquiring the vertical speed of the aircraft Vp which are linked to the processing means 50. These acquisition means 80 take for example the form of a tachymeter 80 continuously measuring the vertical speed of the aircraft Vp over time.

In contradistinction to the first embodiment, the processing means 50 of the second embodiment comprise an additional input providing the vertical speed of the aircraft Vp, the input Vp being positive when the current altitude of the aircraft Zp is increasing and negative when it is decreasing. The deviation detection logic chains are identical between the first and the second embodiment, the divergence detection logic chains being different.

Figure 4:
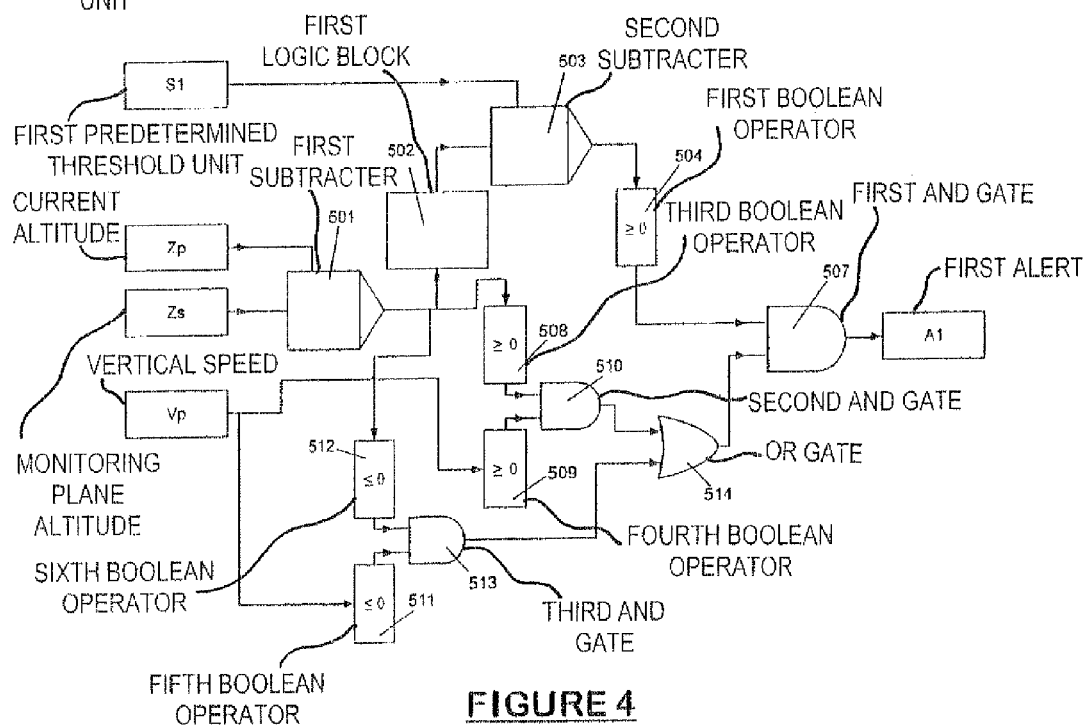
FIG. 4 schematically represents the processing means of the viewing system of FIG. 3.

FIG. 4 represents the processing means 50 of the meteorological data viewing system 1 according to the second embodiment of the invention of FIG. 3. With reference to FIG. 4, Boolean operators 509, 508 respectively receive as input the vertical speed of the aircraft Vp and the output of the subtracter 501 providing the altitude difference Dz. Each Boolean operator 509, 508 emits as output an affirmative response if its input is positive or zero, a negative response being emitted in the other cases. The outputs of the Boolean operators 509, 508 are linked to the inputs of an "AND" gate 510 which emits an affirmative output when its two inputs are simultaneously affirmative. Thus, the output of the "AND" gate 510 is affirmative when the difference of altitudes Dz is positive (Boolean operator 508) and the vertical speed of the aircraft Vp is positive (Boolean operator 509).

In a similar manner, Boolean operators 511, 512 respectively receive as input the vertical speed of the aircraft Vp and the output of the subtracter 501 providing the altitude difference Dz. Each Boolean operator 511, 512 emits as output an affirmative response if its input is negative or zero, a negative response being emitted in the other cases. The outputs of the Boolean operators 511, 512 are linked to the inputs of an "AND" gate 513 which emits an affirmative output when its two inputs are simultaneously affirmative. Thus, the output of the "AND" gate 513 is affirmative when the difference of altitudes Dz is negative (Boolean operator 511) and the vertical speed of the aircraft Vp is negative (Boolean operator 512).

The outputs of the "AND" gates 510, 513 are linked at input to an "OR" gate 514 which emits an affirmative output when one of its two inputs is affirmative. The output of the "OR" gate 514 is linked to the input of the "AND" gate 504 described previously.

Thus, in this second embodiment, the vertical speed of the aircraft Vp is measured and it is deduced that the altitude difference Dz diverges when:

the altitude difference Dz is positive (Boolean operator 508) and the vertical speed of the aircraft Vp is positive (Boolean operator 509) simultaneously ("AND" gate 510) or ("OR" gate 514) when the altitude difference Dz is negative (Boolean operator 512) and the vertical speed of the aircraft Vp is negative (Boolean operator 511) simultaneously ("AND" gate 513).

Figure 5:
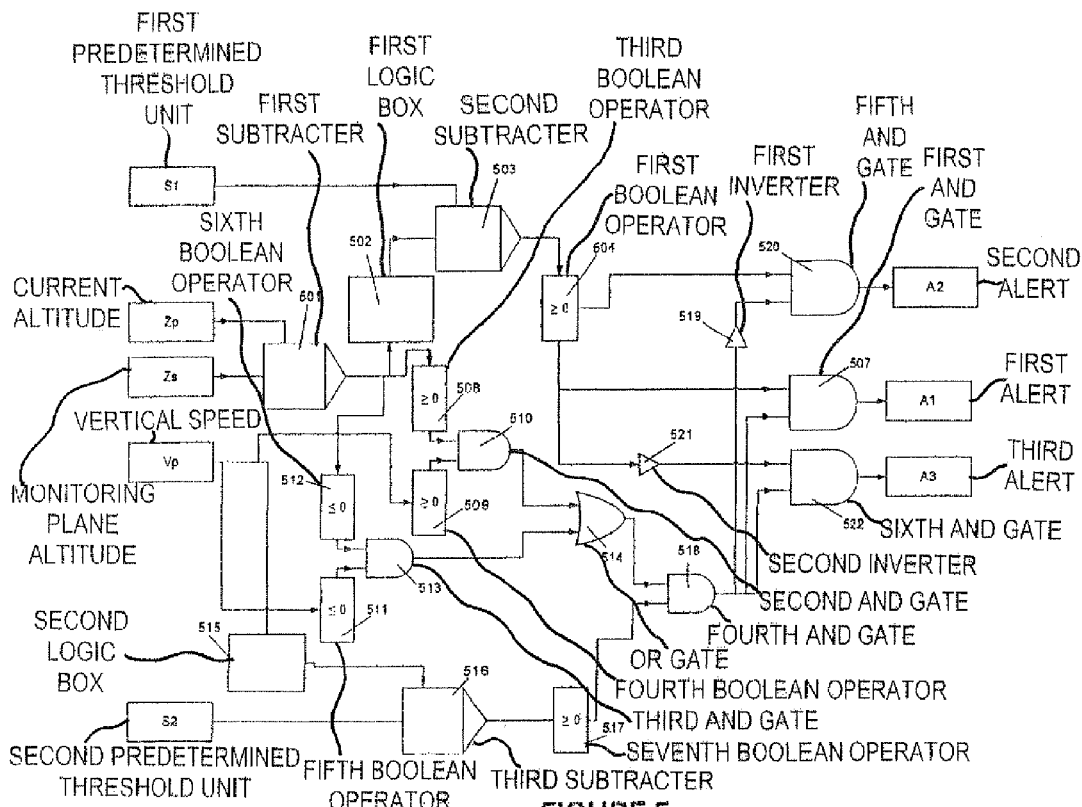
FIG. 5 schematically represents the processing means of a third embodiment of the viewing system according to the invention.

In a third embodiment of the invention, represented in FIG. 5, the processing means 50 are designed to emit several messages for activating different alerts A1, A2, A3. This new embodiment comprises all the discrete logic elements of the second embodiment described previously.

First Alert A1

Still with reference to FIG. 5, the processing means 50 comprise a logic block 515, designed to calculate the absolute value of the vertical speed of the aircraft Vp. The logic block 505 is linked to the input of a subtracter 516 designed to subtract the absolute value of the vertical speed of the aircraft Vp, from a second threshold S2, termed the speed threshold S2. The output of the subtracter 516 is linked to the input of a Boolean operator 517 which emits as output an affirmative response if its input is positive or zero, a negative response being emitted in the other cases. The outputs of the "OR" gate 514 and of the Boolean operator 517 are linked to the inputs of an "AND" gate 518 which emits an affirmative output when its two inputs are simultaneously affirmative.

The presence of a speed threshold S2 advantageously makes it possible to avoid the emission of critical alerts A1 when the value of the altitude of the aircraft oscillates about a constant altitude. This oscillation in altitude is common as the aircraft flies along its itinerary. During such a "porpoising" of the aircraft, the emission of critical alerts A1 is disabled.

Still with reference to FIG. 5, the outputs of the Boolean operator 503 and of the "AND" gate 518 are linked to the input of the "AND" gate 504 which emits as output the message for activating the first alert A1, if its two inputs are simultaneously positive. If the vertical speed Vp is below the guard threshold S2, there is no divergence detection, no critical alert A1 is emitted.

Second Alert A2

With reference to FIG. 5, an inverter 519 is mounted at the output of the "AND" gate 518 which determines a divergence of the altitude difference DZ. An inverter is designed to invert its output with respect to its input, for example, by transforming an affirmative input into a negative output and, reciprocally, by transforming a negative input into an affirmative output.

The outputs of the Boolean operator 504 and of the inverter 519 are linked to the input of an "AND" gate 520 which emits as output a message for activating a second alert A2, when its two inputs are simultaneously affirmative. The message for activating the second alert A2 is transmitted to the means for generating alerts 70.

Thus, a second alert A2 is emitted for the attention of the operators upon detection of a deviation and of a convergence of the aircraft. Likewise, when the vertical speed Vp of the aircraft is below the speed threshold S2, that is to say during porpoising, the second alert A2 is emitted in the event that a deviation is detected. The second deviation alert A2 makes it possible to forewarn the operators of a possible omission of the elevation function.

Third Alert A3

With reference to FIG. 5, an inverter 521 is mounted at the output of the Boolean operator 504 which determines a deviation of altitudes. The outputs of the "AND" gate 518 and of the inverter 521 are linked to the input of an "AND" gate 522 which emits as output a message for activating a third alert A3 when its two inputs are simultaneously affirmative. This message for activating the third divergence alert A3 is transmitted to the means for generating alerts 70.

Thus, a third alert A3 is emitted for the attention of the operator when the vertical speed Vp exceeds or equals the speed threshold S2, when the aircraft diverges and when the difference of the altitudes Dz is below the deviation threshold S1. The third alert A3 is a divergence alert.

In a second exemplary implementation of the invention, the altitude of the monitoring plane is constant and equal to 60000 feet (18 300 meters), the first threshold S1 is fixed and equal to 4000 feet (1 200 meters), the second threshold S2 is fixed and equal to 200 feet/min (60 meters per minute) and the altitude of the aircraft evolves in accordance with table 2 below.

TABLE 2

Implementation example 2

| Instants (in seconds) | T1 = 10 | T2 = 30 | T3 = 50 |
| --- | --- | --- | --- |
| Current altitude of the aircraft Zp (in feet) | 56500 | 55500 | 55400 |
| Altitude of the monitoring plane Zs (in feet) | 60000 | 60000 | 60000 |
| Dz | −3500 | −4500 | −4600 |
| Vp (feet/min) | −350 | +50 | −250 |
| Activation of an alert | A3 | A2 | A1 |

With reference to table 2, at the instant T1, the absolute value of the altitude difference Dz is below the first threshold S1 (3500<4000). No deviation is detected. A divergence is detected at the instant T1 since the vertical speed of the aircraft exceeds the second threshold S2 (350>200) and the aircraft is moving away from the altitude of the monitoring plane. A third divergence alert A3 is emitted.

At the instant T2, the absolute value of the altitude difference Dz is above the first threshold S1 (4500>4000). A deviation is detected. No divergence alert A3 or critical alert A1 is emitted at the instant T3, the vertical speed of the aircraft being below the second threshold S2 (50<200), the critical alert A1 being disabled. However, the second deviation alert A2 is emitted since the aircraft is converging.

At the instant T3, the absolute value of the altitude difference Dz is above the first threshold S1 (4600>4000). A deviation is detected. A divergence is also detected at the instant T3 since the vertical speed of the aircraft exceeds the second threshold S2 (250>200) and the aircraft is moving away from the altitude of the monitoring plane. As a divergence and a deviation are detected simultaneously, a first alert A1 is emitted.

The various emissions of alerts can be summarized in table 3 below.

TABLE 3

Conditions of alerts

| | Divergence | ABS(Dz) < S1 | ABS(Dz) > S1 |
| --- | --- | --- | --- |
| ABS(Vp) < S2 | NO | — | A2 |
| ABS(Vp) ≧ S2 | NO | — | A2 |
| ABS(Vp) < S2 | YES | — | A2 (A1 disabled) |
| ABS(Vp) ≧ S2 | YES | A3 | A1 |

Figure 6:
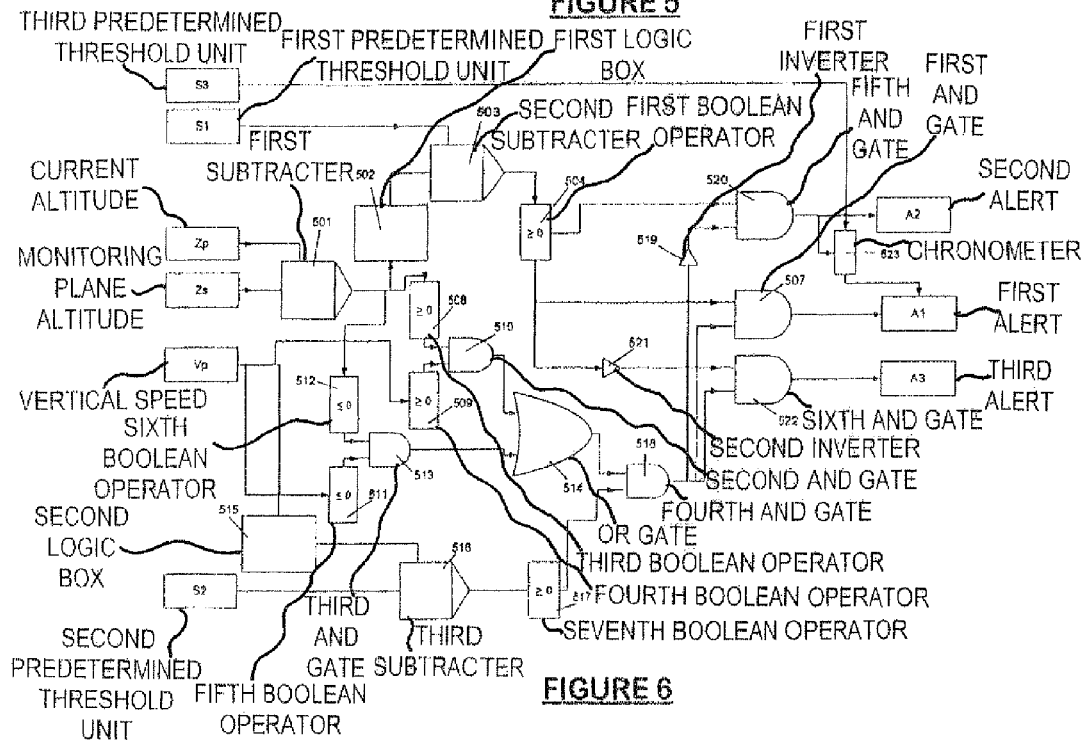
FIG. 6 schematically represents the processing means of a fourth embodiment of the viewing system according to the invention.

The fourth embodiment of the present invention, represented in FIG. 6, repeats all the discrete logic elements of the third embodiment. The processing means 50 are designed to emit a message for activating the first alert A1 when a deviation is detected for a determined time period. For this purpose, a third threshold S3 is introduced, termed the time threshold S3, corresponding to the maximum time for detecting a deviation before activation of the first alert A1.

The processing means 50 comprise a chronometer 523, receiving as input the output of the "AND" gate 520, detecting a deviation and a convergence, and the time threshold S3. When the output of the "AND" gate 520 is affirmative for a time period greater than or equal to the value of the third threshold S3, the chronometer 523 emits a message for activating the first alert A1.

Although the divergence criterion is not complied with, a critical alert A1 is nevertheless emitted by the alerts generator 70. This makes it possible to preclude the possibility of the aircraft remaining at an altitude too far from the monitoring plane for a long time period.

Preferably, the third time threshold S3 is chosen so as to leave the operators sufficient time to avoid a bad weather zone situated on the itinerary of the aircraft. For example, the third threshold is between 3 and 8 flying minutes.

It goes without saying that the time threshold S3 could also be dynamic.

The means for generating alerts 70 will now be more particularly described. Upon receipt of a message for activating an alert, a visual or audible cue is emitted for the attention of the operators.

By way of example, with reference to FIG. 7, upon the activation of a first, second or third alert, an alert message 72 is displayed on the navigation screen ND. The nature of the message displayed on the navigation screen depends on the nature of the alert (deviation and/or divergence). If the alert is critical (first alert A1), the alert message 72 is flashing as is the display 73 of the altitude of the monitoring plane Zs on the navigation screen ND. The attention of the operators is then immediately attracted. The more significant the danger, the more intrusive the alert.

Moreover, the viewing means 10 can also comprise a second viewing screen making it possible to provide relief data and meteorological data in a vertical plane, that is to say at different altitudes. This screen, termed the vertical screen VD, takes the form of a rectangle whose left lateral edge is graduated vertically in altitude. A symbol representing an airplane is displayed on the vertical screen VD at the altitude of the airplane, the pilot thus being able to easily observe whether bad weather is forming above or below the aircraft. The airplane symbol can move vertically on the vertical screen VD. The altitude of the monitoring plane is displayed on this vertical screen VD in the form of a horizontal line level with the corresponding graduation if the altitude of the monitoring plane is situated within the limits of the display of the screen VD. The horizontal line abuts against one of the edges of the screen VD when the altitude of the monitoring plane exceeds the display limits of the screen VD.

Figure 8:
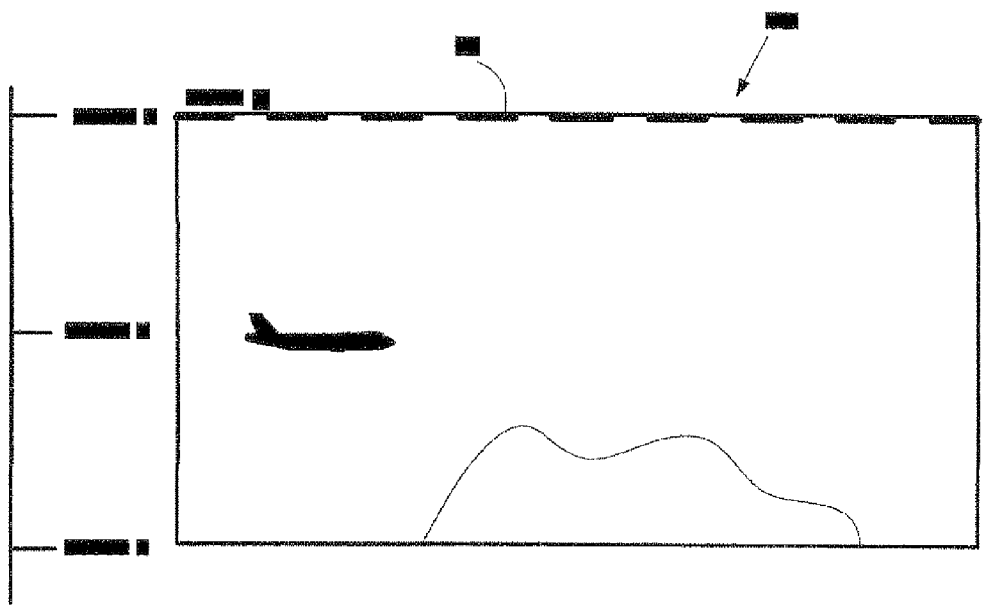
FIG. 8 schematically represents the emission of an alert message on a vertical viewing screen of a viewing system in accordance with the invention, the viewing screen being graduated in feet (ft).

With reference to FIG. 8, in the event of a critical alert (first alert A1), the horizontal line is displayed flashing on the vertical screen VD. Thus, if the operators are in the process of looking at the vertical screen VD, their attention is attracted. Likewise, the lettering "ELEVN" in the top left corner of the vertical screen could flash to alert the operators.

It goes without saying that the first alert A1, described as critical, could be accentuated with respect to the second and third alerts A2, A3 by modifying the font or the color of the alert messages displayed.

The invention claimed is:

1. A method for generating alerts by a system configured for viewing meteorological data and generating said alerts in an aircraft,
   wherein said system comprises:
      a navigation screen configured to display meteorological data in a monitoring plane at a determined altitude (Zs), and an altitude determination unit configured to determine the current altitude (Zp) of the aircraft, said method comprising the steps of:

adjusting said monitoring plane to an automatic mode to match the determined altitude (Zs) with the current altitude (Zp) of said aircraft or to a manual mode to view the meteorological data at said determined altitude, with said determined altitude (Zs) being different from the current altitude (Zp), wherein, when said displayed monitoring plane is adjusted to manual mode, the altitude difference (Dz) between said current altitude (Zp) and said altitude of the monitoring plane (Zs) is determined by a processor;

comparing, by said processor, said determined altitude difference (Dz) with a first predetermined deviation threshold (S1); and emitting, by an alert generating unit, a first alert (A1) under conditions in which:
 i. said altitude difference (Dz) attains or exceeds said first predetermined deviation threshold (S1) and
 ii. said altitude difference (Dz) diverges.

2. The method as claimed in claim 1, further comprising:
emitting a second alert (A2) to indicate:
 i. said altitude difference (Dz) attains or exceeds said deviation threshold (S1) and
 ii. said altitude difference (Dz) converges.

3. The method as claimed in claim 1, further comprising:
measuring vertical speed of the aircraft (Vp) and determining that said attitude difference (Dz) diverges under conditions in which:
 i. said altitude difference (Dz) is positive and
 ii. said vertical speed of the aircraft (Vp) is positive.

4. The method as claimed in claim 1, further comprising:
measuring vertical speed of the aircraft (Vp) and determining that said altitude difference (Dz) diverges under conditions in which:
 i. said altitude difference (Dz) is negative and
 ii. said vertical speed of the aircraft (Vp) is negative.

5. The method as claimed in claim 1, further comprising:
measuring vertical speed of the aircraft (Vp) and disabling emitting said first alert (A1) under conditions in which said vertical speed of the aircraft (Vp) is, in absolute value, below a second predetermined speed threshold (S2).

6. The method as claimed in claim 5, further comprising:
measuring the vertical speed of the aircraft (Vp) and emitting a third alert (A3) under conditions in which:
 i. said vertical speed (Vp) is, in absolute value, above said speed threshold (52),
 ii. said altitude difference (Dz) diverges and
 iii. said altitude difference (Dz) is below said first predetermined deviation threshold (S1).

7. The method as claimed in claim 1, further comprising:
emitting the first alert (A1) under conditions in which:
 i. said altitude difference (Dz) attains or exceeds said first predetermined deviation threshold (S1) for a duration equal to or greater than a third predetermined deviation threshold (S3) and
 ii. said altitude difference (Dz) converges.

8. The method as claimed in claim 1, further comprising:
displaying an alert message on the navigation screen upon emitting an alert.

9. The method as claimed in claim 8, further comprising:
displaying a flashing alert message on the navigation screen upon emitting the first alert.

10. A system for viewing meteorological data in an aircraft, comprising:
navigation screen configured to display meteorological data in a monitoring plane at a determined altitude (Zs);
altitude determination unit configured to determine the current altitude (Zp) of the aircraft,
processor configured to:
 i. determine the altitude difference (Dz) between said current altitude (Zp) and said altitude of the monitoring plane (Zs);
 ii. compare said altitude difference (Dz) with a first deviation threshold (S1) and
 iii. detect a divergence of said altitude difference (Dz); and
alert generating unit configured to emit a first alert (A1) for the pilot under conditions in which:
 i. said altitude difference (Dz) attains or exceeds the first deviation threshold (S1) and
 ii. the altitude difference (Dz) diverges.

* * * * *